United States Patent
Blattry

[15] 3,659,864
[45] May 2, 1972

[54] CHUCK FOR MACHINE TOOLS

[72] Inventor: Johann Blattry, Buderich, Germany
[73] Assignee: Paul Forkardt Kommanditgesellschaft, Dusseldorf, Germany
[22] Filed: Aug. 6, 1970
[21] Appl. No.: 61,740

[30] Foreign Application Priority Data
Aug. 9, 1969 Germany..................P 19 40 609.8

[52] U.S. Cl..............................279/121, 279/74, 279/110
[51] Int. Cl..........................................................B23b 31/16
[58] Field of Search..................279/110, 66, 74, 1 C, 1 F, 279/121

[56] References Cited

UNITED STATES PATENTS 2,702,713  2/1955  Brenner...................................279/74

Primary Examiner—Gil Weidenfeld
Attorney—Walter Becker

[57] ABSTRACT

A chuck for mounting on the spindle of a machine tool comprises a plurality of jaws movable radially by an axially movable plunger. The connexion between the jaws and the plunger can be disengaged so that the jaws can be moved outwardly under the action of centrifugal force and inwardly under the action of a program-controlled thrust roller.

6 Claims, 4 Drawing Figures

Patented May 2, 1972

INVENTOR.
Johann Blättry
BY

3,659,864

CHUCK FOR MACHINE TOOLS

BACKGROUND OF THE INVENTION

1. Field of the Invention.

The present invention relates to chucks for machine tools.

2. Description of the Prior Art.

In one form of chuck proposed hitherto, to enable workpieces to different diameters to be clamped each jaw of the chuck comprises a main and an auxiliary jaw, of which the letter can be adjusted continuously, in steps, or can be transposed in relation to the main jaw. Further enlargement of the possible range of movement can be obtained by the provision of different sets of auxiliary jaws for use with the check or by adjustment of the position of the main jaws.

In this previously proposed chuck, adjustment must be carried out by hand, each individual jaw having to be changed over or, where common central adjustment is provided, fairly considerable mechanical complication being necessary.

SUMMARY OF THE INVENTION

According to the invention, there is provided a chuck for a machine tool, comprising a body having a plurality of generally radially extending guide means arranged around the axis of the body, a plurality of jaws each mounted for generally radial movement in a respective one of said guide means, jaw-setting plunger means mounted for axial movement in said body, and means detachably connecting said jaws with said plunger means for moving said jaws radially in response to axial movement of said plunger means, whereby, when said connecting means is detached, said jaws can be moved radially outwards by centrifugal force and can be set to a predetermined checking diameter by a controlled thrust roller forming a part of the machine tool.

Further according to the invention, there is provided a chuck for mounting on the spindle of a machine tool, comprising a body having a plurality of generally radially extending guide means, a plurality of jaws each mounted for radial movement in a respective one of said guide means, jaw-actuating means mounted for movement in said body, means detachably coupling said jaws to said actuating means for moving said jaws radially in response to movement of said actuating means, and means for limiting radial outwards of said jaws due to centrifugal force when said jaws are detached from said actuating means, each said jaw having a surface engagable by a thrust roller externally of said chuck to move said jaws radially inwardly when said jaws are detached from said actuating means.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 3:
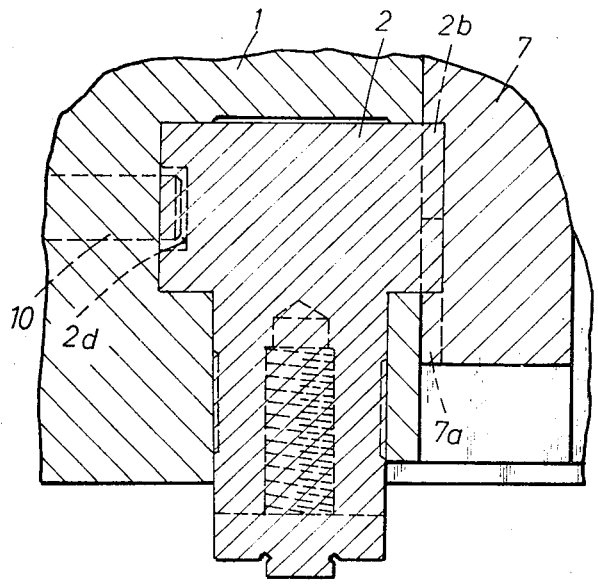
FIG. 3 is a section to an enlarged scale, taken on line III—III in FIG. 1.

In the chuck illustrated, six jaws are arranged to move radially in a chuck body 1. Each jaw comprises a main jaw 2, and an auxiliary jaw 3. The cross section of the main jaw 2 and the manner in which it is mounted within the body 1 can be seen from FIG. 3. The chuck body 1 is secured by fixing bolts 4 to a hollow spindle 5 of a machine tool ( not shown ).

Figure 1:
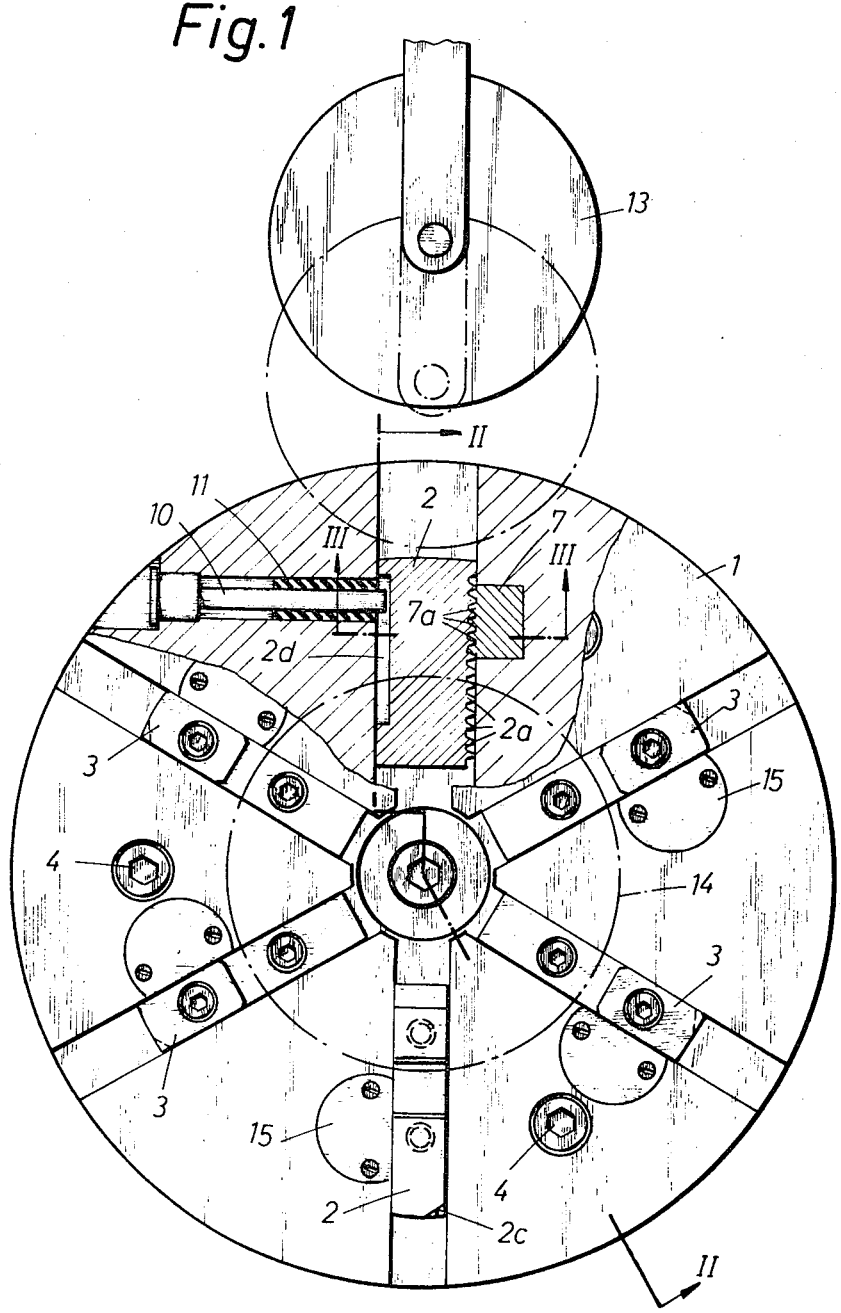
FIG. 1 is a front elevation partially in section, of a chuck in accordance with the present invention.
Figure 2:
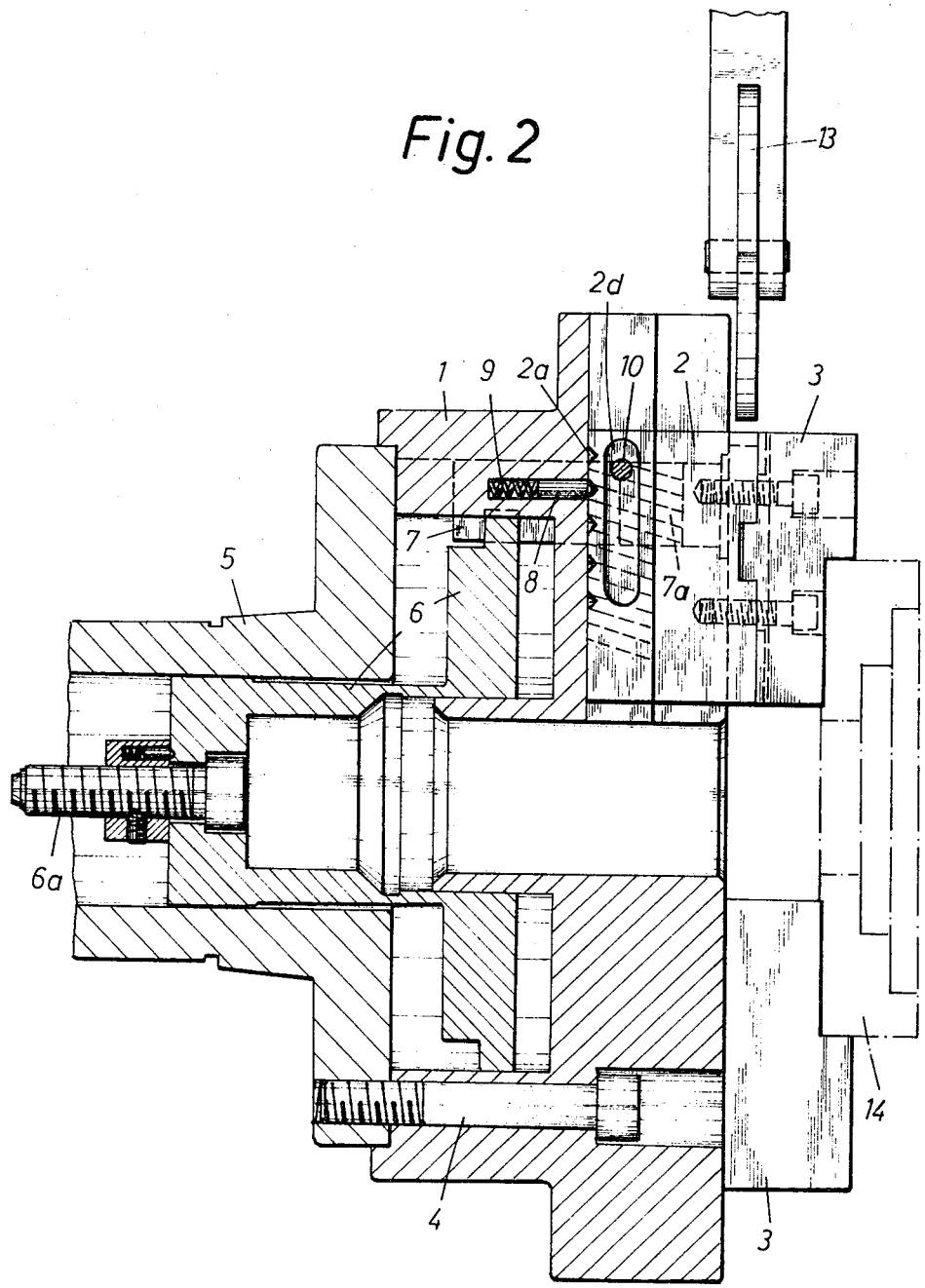
FIG. 2 is a section taken on the line II—II in FIG. 1.

Radial motion is imparted to the main jaws 2 by a setting plunger 6 mounted for axial movement in the body 1 and arranged for connection to an actuating rod ( not shown). The actuating rod extends through the hollow spindle 5 and is connected at its end remote from the plunger 6 to a suitable cylinder which is actuable to axially move the actuating rod. Axial movements of the plunger 6 are transmitted to the main jaws 2 by respective splined bars 7, one end of which is connected to the plunger 6. The splined bars 7 are mounted for axial movement within the body 1 and carry oblique tooth-like splines 7a at their forward end portion on the face thereof which lies adjacent to the corresponding main jaw 2. The splines 7a of each bar 7 are engaged with teeth 2b, provided on one of the side faces of its corresponding main jaw 2 as can be seen in FIG. 1. Since the splines 7a and teeth 2b extend obliquely, axial movement of the bars 7 will result in radial movement of the main jaws 2.

The rear face of each main jaw 2 is provided with a number of notches 2a in which a positioning pin 8, mounted in the body 1, can be engaged by the action of a compression spring 9. That face of each jaw 2 which lies opposite to the face carrying the teeth 2b contains a radial slot 2d into which a catch bolt 10 projects. The catch bolt 10 is mounted in a rubber bush 11 within the body 1 and serves to limit the travel of the main jaw 2.

Figure 4:
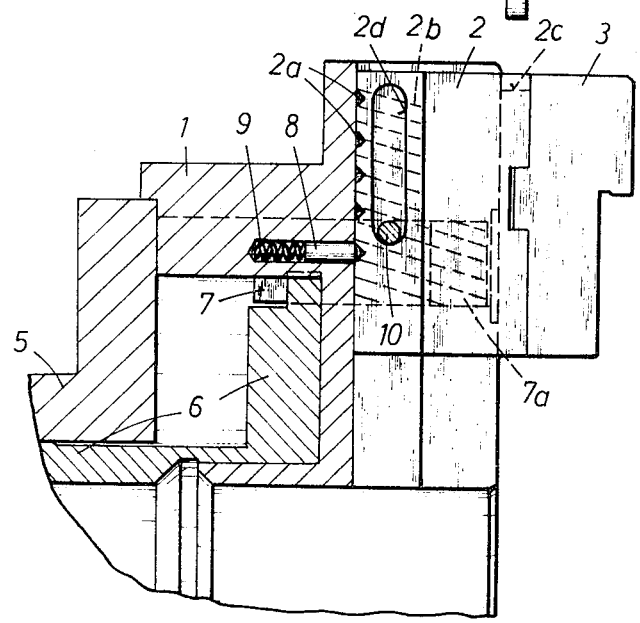
FIG. 4 is a longitudinal section through part of the chuck and through one jaw when located at its outer radial position.

The bars 7 can be thrust forwardly by the plunger 6 into a terminal position until the splines 7a move out of engagement with the teeth 2a as shown in FIG. 4. In this position, the jaws 2 are free to move radially, once they have overcome the retaining force exerted by the positioning pins 8. By increasing the speed of rotation of the spindle while the splined bars 7 are so positioned, all the main jaws 2 can be thrust outwardly to their extreme outer radial position which is determined by the catch bolts 10 located within the radial slots 2d in the jaws 2. With the jaws 2 so positioned the speed of rotation of the spindle 5 is reduced, and the jaws 2 are moved radially inwardly by a program-controlled thrust roller 13 to a position corresponding to the desired chucking diameter. To prevent damage to the thrust roller 13, each of the jaws 2 is provided with an oblique approach face 2c visible in particular on the jaw 2 occupying the bottom position in FIG. 1.

The main jaws 2 are held in a position approximating to the chucking diameter by the spring-loaded positioning pins 8, which are thus able to exert a certain centralizing action. Further, the pins 8 act to position accurately the splines 7a in relation to the teeth 2b to permit reengagement thereof without the possibility of damage arising from fouling between the splines 7a and teeth 2b. The jaws 2 are now in the desired-diameter position, so that a workpiece 14, of the corresponding diameter can be clamped by axial movement of the plunger 6 and hence of the splined bars 7 towards the spindle 5.

Although the splined bars 7 are particularly advantageous for linking the plunger 6 to the jaws 2, means other than the splined bars 7 can be used to link the plunger 6 to the main jaws 2. The linking means can be either indirect, as in the embodiment illustrated, or direct.

The bars 7 are accessible from the front of the body 1, through apertures provided for this purpose, these apertures being closed by cover plates, 15.

In the chuck described, not only is the range of chucking diameters greater compared with the previously proposed chucks but a particular chucking diameter can be pre-selected according to the workpiece concerned and can be programed so that the chuck is automatically set to the particular diameter required before the commencement of a fresh job. This makes the chuck particularly suitable for digitally controlled machine tools.

It is, of course, to be understood that the present invention is, by no means, limited to the chuck set forth above, but also comprises any modifications within the scope of the appended claims.

What is claimed is:

1. A chuck for a machine tool, comprising a body having a plurality of generally radially extending guide means arranged around the axis of the body, a plurality of jaws each mounted for generally radial movement in a respective one of said guide means, jaw-setting means movably mounted in said body, said jaw-setting means moving said jaws radially in response to the movement of said jaw-setting means, said jaw-setting means including means detachably connecting said jaws with said jaw-setting means, whereby, when said connecting means is detached, said jaws can be moved radially outwards by centrifugal force, and said machine tool including controlled thrust roller means being engagable with the outer surface of each of said jaws to move said jaws radially inwardly when said jaws are detachably connected from said jaw-setting means.

2. A chuck according to claim 1 further comprising
pin means mounted for movement in said body,
means defining notches on said jaws, and
resilient means biasing said pin means into said notches.

3. A chuck according to claim 1 wherein each said jaw includes
an oblique face arranged to contact the thrust roller means.

4. A chuck according to claim 1 wherein each said jaw has a radially extending slot, said chuck further comprising,
abutment means extending into each said slot to limit radial outwards movement of said jaws.

5. A chuck according to claim 1, further comprising teeth formed on a face of said jaws, and wherein said connecting means comprises bar means mounted for movement with said jaw-setting means and having a face toothed at an angle to its moving direction, said toothed face being releasably engageable with said teeth on the jaws.

6. A chuck for mounting on the spindle of a machine tool, comprising
a body having a plurality of generally radially extending guide means
a plurality of jaws each mounted for radial movement in a respective one of said guide means,
jaw-actuating means mounted for movement in said body and for moving said jaws radially in response to movement of said actuating means, said actuating means including means detachably coupling said jaws with said actuating means,
means for limiting radial outward movement of said jaws due to centrifugal force when said jaws are detached from said actuating means, thrust roller means externally of said chuck being engagable with an outer surface on each of said jaws to move said jaws radially inwardly when said jaws are detached from said actuating means.

* * * * *